Figure 1:
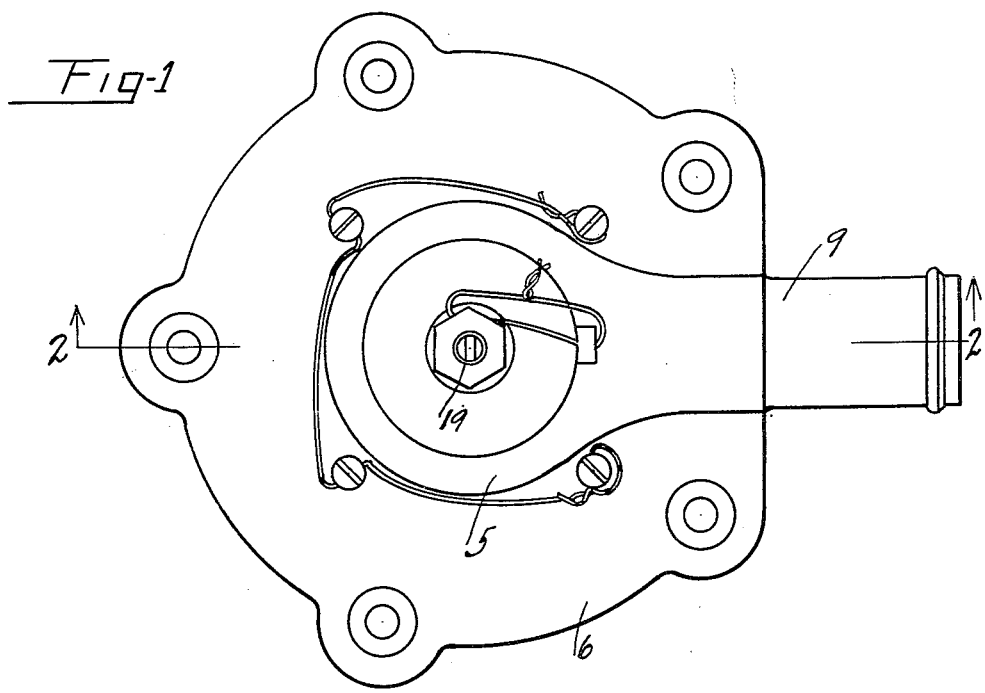

March 19, 1957    E. J. KIMM ET AL    2,785,861
TANK VENT CONTROLLING MECHANISM
Filed Feb. 21, 1951

INVENTORS
EWALD J. KIMM
PAUL F. EARLY
BY Edmund H. Reed
ATTORNEY

United States Patent Office 2,785,861
Patented Mar. 19, 1957

2,785,861

TANK VENT CONTROLLING MECHANISM

Ewald J. Kimm and Paul F. Early, Dayton, Ohio, assignors to Standard-Thomson Corporation, Dayton, Ohio, a corporation of Delaware Application February 21, 1951, Serial No. 212,154

2 Claims. (Cl. 236—92)

This invention relates to a pressure relief mechanism and is designed primarily for controlling the vent for the oil tank of an aircraft engine.

One object of the invention is to provide a vent control mechanism which will automatically maintain tank pressure within the desired limits at all altitudes and under all conditions of operation.

Under normal operating conditions of an aircraft engine, the oil in the circulation system, after passing through the engine, is still warm when returned to the oil tank. With an increase in altitude reduction in atmospheric pressure causes this oil to foam and a substantial quantity of foaming oil escapes through the oil tank vent valve. A specific object of the invention is to prevent this loss of oil by pressurizing the tank, thus controlling the foaming of the oil.

When an aircraft engine is shut down in high altitude flight the oil tank becomes very cold and the temperature of the oil falls below its pour point. Under such conditions the congealed oil on the valve parts will prevent, or at least seriously retard, the opening of the control valve, and a further object of the invention is to provide a control mechanism with a temperature sensitive element which will cause the valve to open before the oil temperature falls to the pour point so that the tank pressure will be relieved when the engine is again started.

The foaming of the oil, above mentioned, does not occur until a combination of normal operating temperature and high altitude is reached and it is desirable to maintain the valve open at low altitudes and to close the same only when the foaming starts or is about to start. A further object of the invention is to provide a mechanism with an aneroid element which will close the valve under conditions of high altitude and normal operating temperature, while permitting the valve to open at high altitude and low temperature.

Under certain conditions of operation with the valve closed, such as when the pilot of an airplane elects to dive when the plane is at high altitude, a condition exists in which the outside air pressure will become greater than the oil tank's internal pressure. It is, therefore, a further object of the invention to provide a control mechanism which will open the valve under such a condition of operation.

It is also an object of the invention to provide a mechanism capable of accomplishing all the foregoing results and having a single valve seat.

Other objects of the invention may appear as the mechanism is described in detail.

Figure 2:
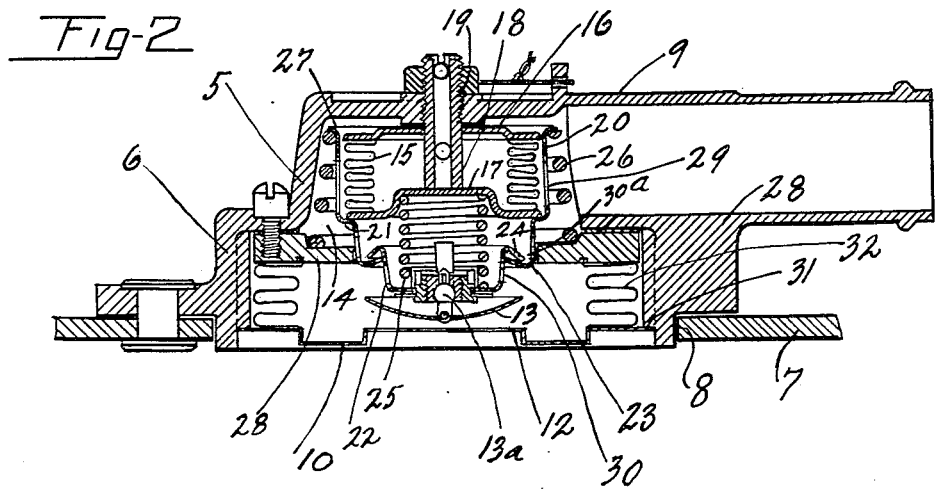

In the accompanying drawings Fig. 1 is a top plan view of a control mechanism embodying the invention; and Fig. 2 is a sectional view taken on line 2—2 of Fig. 1.

In these drawings, we have illustrated one embodiment of our invention and have shown the same designed for application to the oil tank of an aircraft, but it is to be understood that the mechanism as a whole, as well as the several parts thereof, may take various forms and may be used in connection with tanks of various kinds without departing from the spirit of the invention.

In that embodiment of the invention here illustrated the mechanism comprises a casing including a base 5, having an annular lower portion 6 adapted to be secured to a tank about a vent opening therein, a portion of the tank being shown at 7 and the vent opening at 8. The casing also includes a laterally extending tubular portion 9 which communicates with the interior of the base to provide a passage 14 connecting the tank with the atmosphere.

Interposed between the interior of the annular portion 6 of the casing and the vent in the tank is a member, such as a plate 10, having therein an opening communicating with the vent in the tank and about which there extends a valve seat 12, which as here shown is integral with the plate. Preferably the plate 10 is movably supported in the casing for a purpose which will hereinafter appear. Movably mounted in the casing above the valve seat is a valve member 13 which is movable into and out of engagement with the valve seat 12. In the present construction the valve member 13 is provided with a convex seat-engaging surface and is connected with a supporting structure by a universal joint 13a.

Mounted in the passage 14, between the annular and tubular portions of the casing, is a thermostatic bellows 15 which is responsive to variations in the ambient temperature and to variations in the fluid from the tank passing through the valve opening. The bellows 15 is connected with the valve member 13 to move the same toward and from the valve seat 12. One end member, 16, of the bellows is fixed with relation to the casing and the other end member, 17, is movable toward and from the fixed end member. Preferably the end member 16 of the bellows is rigidly connected with a tubular stud 18 having its upper portion 19 threaded into an opening in the top wall of the casing. The lower portion of this stud extends into the bellows to a position in which it will be engaged by the movable end member 17 to limit the contraction of the bellows. The bellows contains a relatively small quantity of a suitable volatile liquid the pressure characteristics of which are such that the correct pressure will be exerted in the bellows by its vapor at valve operating temperatures. Preferably the quantity of volatile liquid is such that at high temperatures it will be completely vaporized, thus limiting the vapor pressures at high temperatures.

The valve member 13 may be connected with the movable end 17 of the bellows in any suitable manner. Preferably a valve supporting structure, such as a housing 20, extends about the bellows and is connected with the movable end member 17 thereof for movement therewith, as by providing the housing with an inwardly extending shoulder 21 which is engaged by the end member 17. The housing includes a cup-shaped lower portion, or cap 22, with which the valve member 13 is connected and which is movable with relation to the upper portion of the housing. In the arrangement shown the upper portion of the housing is provided at its lower end with an inwardly extending lip, or flange, 23 and the cup-shaped portion 22 of the housing is provided with an outwardly extending lip or flange 24 which overlies the flange 23 and has supporting engagement therewith. A coil spring 25 is confined between the cup-shaped portion of the housing and the movable end 17 of the bellows to normally retain the cup-shaped portion in its fully extended position with relation to the upper portion of the housing. Means are provided for exerting a relatively constant force in the bellows in a direction to resist expansion thereof, this means preferably comprising a spring 26 extending about the upper portion of the housing and confined between an outwardly extending flange 27 at the upper end of the housing and an annular member 28 rigid with the casing. The bellows is also subjected to atmospheric pressure in a direction opposed to the expansion thereof, as by providing the housing with openings 29, 30 and 39a which connect the passage 14 with the interior of the housing. These openings also permit the escape of any oil which may accumulate in the housing.

The opening and closing of the valve 12—13 is controlled by the relative values of the forces acting on the bellows under different operating conditions. The bellows being supported in the passage connecting the tank with the atmosphere, the fluid in the bellows will expand and contract in response to variations in tank temperature and thus the expanding force in the bellows varies with tank temperature. Atmospheric pressure, of course, varies with the altitude of the aircraft on which the mechanism is mounted but the force exerted on the bellows by the spring 26 is a relatively constant force and both this constant force and atmospheric pressure are opposed to the expansion of the bellows. The relative values of the three forces are such that when the mechanism is operating at a relatively low altitude, herein termed "sea level," and the oil, or other liquid, in the tank is at a normal temperature, the combined forces of the spring 26 and of atmospheric pressure will exceed the expansive force on the bellows and the bellows will be moved to or retained in a contracted condition, thus moving the valve member 13 to, or retaining the same in, valve opening position. If the aircraft moves to a high altitude, say 40,000 feet, and tank temperatures remains normal, the atmospheric pressure will be so low that the combined forces of atmospheric pressure and spring pressure on the bellows will be less than the expansive force on the bellows and the bellows will expand and move the valve member to valve closing position. If tank pressure should, while the valve remains closed, become abnormally high, the tank pressure on the valve member will move the valve member and the cup-shaped portion of the supporting housing against the action of the spring 25, thus opening the valve while the bellows is in an expanded condition.

In the event tank temperature, while the valve is closed, becomes equal to or less than the pour point temperature of the oil in the tank, there is danger of congealed oil sealing the valve in its closed position and thus causing a build-up of air pressure in the tank under certain conditions. To avoid this danger, means are provided whereby cold temperatures at high altitudes will move the valve member 13 out of engagement with the valve seat 12, thus relieving the tank pressure. Under these conditions are combined air pressure and spring pressure will be greater than the expansive portion of the bellows, because the bellows will be so cold its internal pressure will be low. Thus the bellows will collapse and the housing 20 will be moved upwardly, pulling the valve member 13 with it and thus open the valve. The quantity of fluid in the bellows is such that this effect will take place even if the mechanism is at high altitude.

In the event tank pressure, while the valve is closed, becomes materially less than atmospheric pressure, there will be danger of the tank collapsing or of other damage to the mechanism. To avoid this danger means are provided whereby such excessive atmospheric pressure will move the valve seat 12 out of engagement with valve member 13 while the bellows remains in an expanded condition. For this purpose the plate 10 which is interposed between the casing and the tank, and which carries the valve seat, is movably supported in the annular portion of the casing and the edge portion thereof is held in sealing engagement with a shoulder 31 in the casing by a spring 32, which is preferably of the bellows type and has sealed connection at its lower end with the plate 10 and at its upper end with the part 28 of the casing. Thus when the valve is closed both the valve member 13 and the plate 10 are subjected to atmospheric pressures and the exposed portion of the plate 10, being of an area materially greater than the area of the valve member 13, the atmospheric pressure on the plate will move the same downwardly so as to disengage the valve seat from the valve member while the latter remains stationary.

Thus it will be apparent that by the use of a single valve seat and a single valve member the opening and closing of the valve may be controlled to provide suitable pressure in the tank under all conditions of operation.

While we have shown and described one embodiment of our invention, we wish it to be understood that we do not wish to be limited to details thereof as various modifications may occur to a person skilled in the art.

Having now fully described our invention, what we claim as new and desire to secure by Letters Patent is:

1. A vent controlling mechanism comprising a casing adapted to be mounted on a tank about a vent opening in a wall of said tank and having a passage to connect said vent opening with the atmosphere, a valve seat extending about said passage, a pressure and temperature responsive member supported in said passage, said member being attached to said casing and having a portion thereof movable toward and away from the valve seat, a housing having an upper portion attached to said movable portion of the pressure and temperature responsive member for movement therewith, the housing having a lower portion movable with relation to the upper portion, means limiting the movement of said lower portion of said housing with respect to said upper portion thereof, a valve member carried by the lower portion of said housing and movable thereby toward and from said valve seat, a spring confined between said lower portion of said housing and said movable portion of said pressure and temperature responsive member to retain said lower portion of the housing normally at the limit of its movement with respect to the upper portion of the housing, spring means confined between said upper portion of the housing and a fixed part of said casing to resist movement of the movable portion of the pressure and temperature responsive member toward said valve seat, a plate supported between said casing and said tank for movement toward and from the tank and having sealed connection with the casing, said plate having an opening therein forming a part of the passage about which the valve seat extends, means yieldably urging movement of said plate toward said tank, movement and position of the valve member thus being affected by internal temperatures and pressures of the tank and by atmospheric temperatures and pressures adjacent the tank.

2. A vent controlling mechanism comprising a casing adapted to be mounted on a tank about a vent opening in a wall of said tank and having a passage to connect said vent opening with the atmosphere, a valve seat extending about said passage, a bellows supported in said passage and containing an expansible fluid responsive to variations in temperature, said bellows having one end thereof fixed with relation to said casing and having its other end movable from said fixed end by the expansion of said fluid, a housing having an upper portion extending about said bellows and connected with the movable end of said bellows for movement therewith, and a lower portion movable with relation to said upper portion toward said movable end of said bellows, a valve member carried by said lower portion of said housing and movable thereby toward and from said valve seat, a spring confined between said lower portion of said housing and said movable end of said bellows to retain said lower portion of said housing normally at the limit of its downward movement with relation to the upper portion of said housing, spring means confined between said housing and a fixed part of said casing to resist the expansion of said bellows, said housing having openings through which atmospheric pressure is exerted on said bellows in a direction to resist the expansion of the latter, a plate supported between said casing and said tank for movement toward the latter and having sealed connection with said casing, said plate having an opening in line with the vent for said tank and forming a part of said passage about which said valve seat extends, means normally preventing the movement of said plate toward said tank, said means being yieldable to permit said valve seat to move out of engagement with said valve when tank pressure is materially less than atmospheric pressure, whereby the expansion and contraction of said bellows is controlled by the relation of the expansive force of the fluid therein to the force of said atmospheric pressure and said valve will be opened while said bellows is expanded when tank pressure becomes excessively high or excessively low.

References Cited in the file of this patent

UNITED STATES PATENTS

| | | |
|---|---|---|
| 1,931,663 | Larson | Oct. 24, 1933 |
| 2,290,059 | Martin-Hurst | July 14, 1942 |
| 2,300,825 | Bloom et al. | Nov. 3, 1942 |
| 2,333,993 | Frailing | Nov. 9, 1943 |
| 2,345,547 | Roth | Mar. 28, 1944 |
| 2,510,472 | Jensen | June 6, 1950 |
| 2,546,715 | Becker | Mar. 27, 1951 |